(12) United States Patent
Caviezel (10) Patent No.: US 12,392,426 B2
(45) Date of Patent: Aug. 19, 2025

(54) MULTILAYER FUEL LINE

(71) Applicant: EMS-CHEMIE AG, Domat/Ems (CH)

(72) Inventor: Heinz Caviezel, Masein (CH)

(73) Assignee: EMS-CHEMIE AG, Domat/Ems (CH)

( * ) Notice: Subject to any disclaimer, the term of this patent is extended or adjusted under 35 U.S.C. 154(b) by 1027 days.

(21) Appl. No.: 17/299,683

(22) PCT Filed: Dec. 11, 2019

(86) PCT No.: PCT/EP2019/084541
§ 371 (c)(1),
(2) Date: Jun. 3, 2021

(87) PCT Pub. No.: WO2020/120523
PCT Pub. Date: Jun. 18, 2020

(65) Prior Publication Data
US 2022/0018467 A1    Jan. 20, 2022

(30) Foreign Application Priority Data

Dec. 12, 2018  (EP) .................................... 18211904

(51) Int. Cl.
*B29C 45/00*    (2006.01)
*B29C 48/00*    (2019.01)
(Continued)

(52) U.S. Cl.
CPC ............... *F16L 11/04* (2013.01); *B32B 1/08* (2013.01); *B32B 27/08* (2013.01); *B32B 27/18* (2013.01);
(Continued)

(58) Field of Classification Search
CPC .. B32B 1/08; B60H 1/00564; B60H 1/00571; Y10T 428/13–1397
(Continued)

(56) References Cited

U.S. PATENT DOCUMENTS 5,849,376 A  * 12/1998  Oishi .................... B32B 27/306
                                                              428/471
11,065,854 B2 * 7/2021  Stöppelmann .......... B32B 27/08
(Continued)

FOREIGN PATENT DOCUMENTS

DE        43 26130 A1    2/1995
DE        44 34 530 A1    3/1995
(Continued)

OTHER PUBLICATIONS

International Search Report for PCT/EP2019/084541 dated Jan. 10, 2020 [PCT/ISA/210].
(Continued)

*Primary Examiner* — Michael C Romanowski
(74) *Attorney, Agent, or Firm* — Sughrue Mion, PLLC (57) ABSTRACT

A plastic line including at least an inner layer, which directly or indirectly encloses an interior space, and an outer layer directly adjacent to the inner layer. The inner layer is based on fluoropolymer, and the outer layer consists of the following constituents: (A) 51-98% of a polyamide from the following group: PA 616, PA 516, PA 618 or mixtures thereof, and copolymers containing at least 50% of at least one of these polyamides and also mixtures of at least one of these polyamides with a further different thermoplastic material (A2), wherein the proportion of these polyamides in such mixtures makes up at least 50%; (B) 2-20% of impact modifiers or plasticizers; (C) 0-29% of additives different from (A) and (B), wherein the components (A)-(C) together make up 100% of the material of the outer layer.

29 Claims, 1 Drawing Sheet

(51) Int. Cl.
  *B29C 49/00* (2006.01)
  *B29C 49/06* (2006.01)
  *B29K 77/00* (2006.01)
  *B29L 23/00* (2006.01)
  *B32B 1/08* (2006.01)
  *B32B 27/08* (2006.01)
  *B32B 27/18* (2006.01)
  *B32B 27/32* (2006.01)
  *B32B 27/34* (2006.01)
  *C08G 69/26* (2006.01)
  *C08L 77/06* (2006.01)
  *F16L 9/133* (2006.01)
  *F16L 11/04* (2006.01)
  *F16L 11/11* (2006.01)

(52) U.S. Cl.
  CPC ............ *B32B 27/322* (2013.01); *B32B 27/34* (2013.01); *C08G 69/26* (2013.01); *C08L 77/06* (2013.01); *F16L 11/11* (2013.01); *B29C 45/0001* (2013.01); *B29C 48/022* (2019.02); *B29C 49/0005* (2013.01); *B29C 49/06* (2013.01); *B29K 2077/00* (2013.01); *B29L 2023/005* (2013.01); *B29L 2023/22* (2013.01); *B32B 2250/02* (2013.01); *B32B 2250/24* (2013.01); *B32B 2270/00* (2013.01); *B32B 2307/732* (2013.01); *B32B 2597/00* (2013.01); *F16L 9/133* (2013.01); *F16L 2011/047* (2013.01); *Y10T 428/1393* (2015.01)

(58) Field of Classification Search
  USPC .............................................. 428/34.1–36.92
  See application file for complete search history.

(56) References Cited

U.S. PATENT DOCUMENTS

| | | | | |
|---|---|---|---|---|
| 11,772,369 B2 * | 10/2023 | Caviezel | ................ | B32B 27/08 138/137 |
| 2003/0099799 A1 * | 5/2003 | Koike | ...................... | B32B 1/08 428/36.91 |
| 2006/0074158 A1 * | 4/2006 | Blondel | ................. | C08K 5/435 524/169 |
| 2008/0057246 A1 * | 3/2008 | Schwitter | ................ | B32B 27/34 427/407.1 |
| 2009/0017246 A1 * | 1/2009 | Malet | ..................... | C08G 69/40 428/221 |
| 2009/0162591 A1 * | 6/2009 | Doshi | ..................... | B32B 27/08 156/296 |
| 2011/0023986 A1 * | 2/2011 | Hoffmann | ............... | C08L 77/06 525/183 |
| 2011/0217559 A1 * | 9/2011 | Bollmann | ......... | B29C 66/73921 428/428 |
| 2012/0000562 A1 * | 1/2012 | Hoffmann | ................ | F16L 9/12 138/118 |
| 2012/0237708 A1 * | 9/2012 | Caviezel | ................ | B43K 19/16 428/36.5 |
| 2013/0048136 A1 * | 2/2013 | Korovessi | ............... | F16L 11/04 435/129 |
| 2013/0115401 A1 | 5/2013 | Doshi et al. | | |
| 2014/0065338 A1 * | 3/2014 | Doshi | ..................... | F16L 9/127 428/36.9 |
| 2014/0066568 A1 * | 3/2014 | Gavenonis | .............. | C08L 77/06 524/538 |
| 2014/0246111 A1 * | 9/2014 | Zimmer | .................. | F16L 9/125 138/140 |
| 2015/0352765 A1 * | 12/2015 | Hoffmann | ............... | B29C 45/78 264/328.13 |
| 2016/0214343 A1 * | 7/2016 | Nakamura | .............. | C08L 77/02 |
| 2017/0261133 A1 * | 9/2017 | Nakamura | .............. | B29C 48/09 |
| 2020/0262188 A1 * | 8/2020 | Tsuboi | ..................... | B32B 1/08 |

FOREIGN PATENT DOCUMENTS

| | | | | |
|---|---|---|---|---|
| DE | 44 10 148 A1 | 9/1995 | | |
| DE | 195 37 003 A1 | 4/1997 | | |
| DE | 199 08 640 A1 | 8/2000 | | |
| DE | 100 65 177 A1 | 6/2002 | | |
| DE | 102004054389 A1 * | 5/2006 | ............ | B82Y 30/00 |
| DE | 102005061530 A1 * | 7/2007 | .............. | B32B 1/08 |
| EP | 1 086 962 A1 | 3/2001 | | |
| EP | 1 217 279 A1 | 6/2002 | | |
| EP | 1 260 747 A1 | 11/2002 | | |
| EP | 1 270 209 A1 | 1/2003 | | |
| EP | 1 884 356 A1 | 2/2008 | | |
| EP | 1 897 685 A1 | 3/2008 | | |
| EP | 3 305 523 A1 | 4/2018 | | |
| EP | 3 330 319 A1 | 6/2018 | | |
| JP | H0615914 B2 * | 3/1994 | ......... | B60H 1/00571 |
| WO | 2017/121962 A1 | 7/2017 | | |
| WO | WO-2019122184 A1 * | 6/2019 | .............. | B32B 1/08 |

OTHER PUBLICATIONS

Written Opinion for PCT/EP2019/084541 dated Jan. 10, 2020 [PCT/ISA/237].

* cited by examiner

MULTILAYER FUEL LINE

CROSS REFERENCE TO RELATED APPLICATIONS

This application is a National Stage of International Application No. PCT/EP2019/084541 filed Dec. 11, 2019, claiming priority based on European Patent Application No. 18211904.0 filed Dec. 12, 2018.

TECHNICAL FIELD

The present invention relates to a multilayer line made of thermoplastic material, in particular for fuels in the automobile sector, and to a process for the production of a line of this type, and to uses of such lines.

PRIOR ART

The use of fuel lines based on layer structures made of plastics, in particular of polyamide, has already long been prior art. Because of the requirements relating to fuel permeability, and also the mechanical properties demanded (e.g. impact resistance or tensile strain at break), and the internal and external resistance to chemicals, preference is given here to use of multilayer pipes which have high heat resistance, high longitudinal stability, and also high resistance to the fuels conducted therein. A low value for permeability (permeation) is particularly relevant here, where this low permeability value must apply not only to the fuel itself, but also to additives or other minor constituents that may be present therein. Resistance to leaching of constituents of the multilayer structure is moreover demanded, as also is good layer adhesion.

Reference is made by way of example in this connection to structures such as those described in DE 43 26 130 or DE 44 10 148. Each of those documents describe a multilayer structure which has a barrier layer based on a fluoropolymer such as polyvinylidene fluoride (PVDF) and, adjoining same, a layer based on a polyamide.

In order to ensure good adhesion between the polyamide and the PVDF, additions in the form of specifically designed polymethacrylimide are added to the PVDF in DE 43 26 130. A frictional connection between the layers is described, and a very wide variety of types of polyamides are cited as possible polyamides. DE 43 26 130 does not provide any information concerning a specific preferred selection of a particular polyamide in respect of firstly particularly good adhesion on the barrier layer and secondly resistance to specific chemicals.

DE 44 10 148 likewise describes a frictionally connected layer structure with a layer made of polyamide and a layer made of PVDF, an acrylate copolymer being admixed with the PVDF here to improve connection to the polyamide. Again, DE 44 10 148 does not provide any information concerning a specific preferred selection of a particular polyamide in respect of firstly particularly good adhesion on the barrier layer and secondly resistance to specific chemicals.

DE 199 08 640 describes a thermoplastic multilayer composite which has a first layer made of a polyamide molding composition and a second layer made of a polyester molding composition. This type of multilayer composite is proposed by way of example for the use as fuel line, and here again various polyamides are proposed as basis for the first layer. It is significant that the use of a specific adhesion-promoter layer between the first and the second layer is regarded as necessary in that document.

DE 100 65 177 likewise describes a multilayer composite which is intended to be suitable for the transport of solvents. The description of barrier layer in that document includes, alongside other systems, the possibility of the additional use of PVDF, and also of ethylene/vinyl alcohol copolymers (EVOH). A wide variety of possible polyamides are moreover cited, which appear to adhere on a layer of the above type only if the arrangement additionally comprises an adhesion-promoter layer, wherein this adhesion-promoting layer is intended to be a mixture of polyamide and polyolefin, and at least a portion thereof must take the form either of graft polymer or of highly branched copolymer.

EP-A-1086962 and EP-A-1270209 provide laminated thermoplastic moldings which comprise a polyamide-based exterior layer and have excellent adhesion between the layers, in particular laminated thermoplastic moldings having a fluorine-containing thermoplastic as interior layer. The invention of EP-A-1270209 is a laminated thermoplastic molding comprising a layer (A) which comprises a thermoplastic composition based on polyamide, and a layer (B) which has been laminated to the layer (A), wherein the layer (B) comprises a fluorine-containing ethylenic polymer having a carbonyl group and the thermoplastic composition based on polyamide has, in addition to an amide group, a functional group selected from the group consisting of hydroxy group, carboxy group, ester group and sulfonamide group in a total quantity of 0.05 to 80 equivalent percent in relation to the amide group.

EP-A-3305523 provides a laminate which is composed of resins and has excellent heat resistance and excellent flexibility and mechanical properties under high-temperature conditions, which also suffers no separation of the layers on prolonged contact with oil, for example engine oil. The laminate comprises a first layer comprising a fluorinated copolymer, and a second layer comprising, laminated directly onto the first layer, a polyamide with high melting point of at least 220° C., wherein the fluorinated copolymer has units based on tetrafluoroethylene, ethylene-based units, and units based on a copolymerizable other monomer with and without carbonyl groups.

WO-A-2017121962 relates to a multilayer tubular structure (MLT) intended for the conveying in particular of gasoline and comprising, from the innermost to the outermost layer, at least one interior barrier layer (1) and at least one external layer (2) situated thereover. Two-layer structures are disclosed, with external layers based on polyamide 12 and internal layers based on polyphthalamide or fluoropolymer.

EP-A-1217279 describes a fuel hose in which an electrically conductive fluororesin is used as internal layer, and the internal surface thereof is smooth even when the hose is molded at high speed. A highly melt-flowable fluororesin with electrical conductivity and with a melt flow rate of 14 to 30 (g/10 min) is used as interior layer. The worked examples always have an external layer based on polyamide 12, an intermediate layer as adhesion promoter and an internal layer based on a fluoropolymer.

EP-A-1260747 describes a line for fuel in the form of multilayer structure, comprising an external layer made of aliphatic polyamide and an interior tube layer made of fluoroplastic. One or both of the aliphatic polyamide and the fluoroplastic is/are respectively a modified aliphatic PA and a modified fluoroplastic. Worked examples use external layers made of polyamide 12 which has been specially modified, and internal layers based on fluoropolymer which likewise has been modified, in order to provide good layer adhesion.

EP-A-1897685 describes a multilayer laminate formed via direct connection, by means of thermal lamination or the like, of a layer (I) made of a fluororesin having a functional group and a layer produced from a thermoplastic resin having a functional group which can enter into chemical bonding via reaction with the functional group of the fluororesin. The fluororesin has a low melting point of 120° C.-230° C. Layer structures with layers based on polyurethane and with layers based on fluorine are processed.

DE-A-4434530 describes a multilayer polymer pipeline with an external layer based on polyamide, an internal layer made of polyvinylidene fluoride or of copolymers thereof, and also an adhesion-promoting intermediate layer which provides frictional connection between the internal and external layer.

EP-A-1884356 describes thermoplastic multilayer composites in the form of an extruded hollow profile, comprising a thermoplastic external layer and at least one further layer, wherein the external layer is composed of a mixture based on. (A) 80 to 20 parts by weight of at least one polyamide (PA) and (B) 20 to 80 parts by weight of at least one polyamide elastomer (TPE-A) selected from the group of the polyetheramides, the polyesteramides, the polyetheresteramides, the polyetheresteretheramides, and mixtures thereof, wherein the entirety of (A) and (B) provides 100 parts by weight, and the hollow profile has been produced at relatively high extrusion speeds, so that the produced hollow profile has a relatively high tensile strain at break when compared with a hollow profile that is otherwise identical but produced at lower extrusion speeds, where the tensile strain at break is measured on the finished hollow profile in accordance with DIN EN ISO 527-2. The low-temperature impact resistance reported is dependent on the presence of an elastomer.

EP-A-1270209 describes a laminated resin molding comprising a resin composition based on polyamide as exterior layer and having excellent adhesion between the layers, in particular a laminated resin molding comprising a fluorine-containing resin as interior layer. The invention relates to a laminated resin molding with a layer (A) comprising a resin composition based on polyamide and a layer (B) laminated onto the layer (A), wherein the layer (B) comprises a fluorine-containing ethylenic polymer with carbonyl groups and the resin composition based on polyamide has, in addition to an amide group, a functional group selected from the group consisting of hydroxy group, carboxy group, ester group and sulfonamide group in a total quantity of 0.05 to 80 equivalent percent relative to the amide group.

US-A-2013115401 relates to thermoplastic compositions with improved hydrolysis resistance at high temperatures. The addition of polyhydroxy polymers to certain polyamides or polyamide mixtures increases the tensile strain at break of these thermoplastic compositions after contact with high-temperature aqueous ethylene glycol solutions. The thermoplastic compositions are suitable for the production of hoses and pipes for the transport of high-temperature aqueous liquids. The subject matter does not include composites with fluoropolymers.

DESCRIPTION OF THE INVENTION

Accordingly, it is an object of the present invention to provide an improved multilayer composite in the form of a hollow body enclosing an internal space. A particular object is to provide a good barrier effect with layers exhibiting as little difference as possible, i.e. with avoidance of adhesion-promoter layers, in particular with good layer adhesion, good resistance to zinc chloride, and also good pressure performance after a period of immersion in the fuel, and moreover with advantageous properties in relation to low-temperature impact resistance, tensile strain at break and leaching resistance.

The present invention accordingly provides a plastics line comprising at least two layers or preferably consisting of two layers, an internal layer which encloses an internal space of the line, and an external layer which directly adjoins the internal layer and preferably delimits the line externally. The invention thus preferably provides lines which consist exclusively of the two layers mentioned, i.e. in which the internal layer directly encloses an internal space of the line, and which have no intervening adhesion-promoter layer or further interior or exterior layers, or lines which have these two mutually adjoining layers on the internal side and also further subsequent layers externally. It is also possible, however, that further innermost layers are present, e.g. that further innermost barrier layers or innermost conductive layers are present, for example those made of, or based on, EVOH, polyphthalamide (PPA, e.g. PA 6T, PA 6T/66, PA 10T/6T) or else taking the form of a further additional innermost internal layer based on fluoropolymer, e.g. with added substances, e.g. conductivity additives, differing from those in the internal layer. It is preferable that no such further innermost internal layers are present.

It is moreover preferable that the materials of the external layer and/or internal layer are free from added adhesion-promoter substances.

The structure of the internal layer in the invention is based on fluoropolymer, preferably based at least on ethylene and tetrafluoroethylene.

The external layer in the invention moreover consists of the following constituents:
 (A) 51-98 percent by weight or 69-98 percent by weight, preferably 75-98 percent by weight, of a polyamide selected from the following group: PA 616, PA 516, PA 618 and mixtures thereof, and also copolymers comprising at least 50 percent by weight of at least one of these polyamides, and also mixtures of at least one of these polyamides with a further thermoplastic (A2) differing therefrom, wherein the proportion of these polyamides in such mixtures is at least 50 percent by weight;
 (B) 2-20 percent by weight of impact modifiers and/or plasticizers;
 (C) 0-29 percent by weight or 0-5 percent by weight of additives differing from (A) and (B),
wherein the proportions by weight of the components (A)-(C) give a total of 100 percent by weight of the material of the external layer.

In the widest sense, therefore, the invention provides a composite comprising directly mutually adjacent and mutually coherent layers (I) and (II),
wherein the layer (I) consists of the following constituents:
 (A) 51-98 percent by weight, preferably 75-98 percent by weight, of a polyamide selected from the following group: PA 616, PA 516, and mixtures thereof, and also copolymers comprising at least 50 percent by weight of at least one of these polyamides, and also mixtures of at least one of these polyamides with a further thermoplastic (A2) differing therefrom, wherein the proportion of these polyamides in such mixtures is at least 50 percent by weight;

(B) 2-20 percent by weight of impact modifiers and/or plasticizers;

(C) 0-29 percent by weight of additives differing from (A) and (B), wherein the proportions by weight of the components (A)-(C) give a total of 100 percent by weight of the material of the layer (I), and a layer (II) whose structure is based on fluoropolymer.

With this specific combination of materials for the internal layer and the external layer it is possible to achieve unexpected good adhesion which by way of example cannot be achieved in the same composition if the external layer consists of polyamide 612 or polyamide 12. It is moreover possible to achieve high resistance to salts, in particular resistance to calcium chloride or zinc chloride, and successful compliance is also achieved with the other values relating to the customary requirements in the fuel line sector.

The external layer preferably delimits the line externally, and preferably the proportion of the component (A) is in the range of 75-98 percent by weight and the proportion of the component (C) is in the range of 0-5 percent by weight.

In an alternative there are, outside of the external layer, one or two further external layers present, and the outermost thereof delimits the line externally, and the configuration of these further external layers is preferably based on PA 612, PA 6, PA 616 or a mixture thereof.

A first preferred embodiment of the proposed plastics line is characterized in that the component (A) consists exclusively of PA 616, or of a copolymer with a proportion of PA 616 of at least 80 percent by weight, or of a mixture of PA 616 with another polyamide, wherein the proportion of PA 616 is at least 80 percent by weight.

It is preferable that the further thermoplastic (A2) of the component (A) is a polyamide differing from PA 616, PA 516, PA 616, preferably an aliphatic or semiaromatic polyamide, with particular preference selected from the group consisting of: PA 6, PA 11, PA 612, PA 10T/6T, PA 1212, PA 66, PA 106, PA 1012, PA 10T/612, PA 10T/610, PA 9T. It is preferable that the component (A) is free from polyamide 12 and/or polyamide elastomers.

The proportion of the component (A) in the material of the external layer can be in the range of 80-95 percent by weight, with particular preference in the range of 84-88 percent by weight. Another preferred embodiment is characterized in that the proportion of the component (B) in the material of the external layer is in the range of 5-18 percent by weight, with particular preference in the range of 10-15 percent by weight. In an alternative, if a conductivity additive is used as component (C), in particular carbon black, the proportion of the component (A) in the material of the external layer is preferably in the range of 55-85 percent by weight, with particular preference in the range of 60-75 percent by weight.

The material of the external layer preferably comprises, for the purposes of the component (B), not only at least one impact modifier but also at least one plasticizer.

The impact modifier can, either used in combination with a plasticizer or else used without plasticizer, be present in a proportion in the range of 2-10 percent by weight, in particular in the range of 4-8 percent by weight, based on the entire composition of the external layer.

The plasticizer can, either used in combination with an impact modifier or else used without impact modifier, be present in a proportion in the range of 2-12 percent by weight, preferably in the range of 5-10 percent by weight, based on the entire composition of the external layer.

It is preferable that the impact modifier is an acid-modified ethylene-α-olefin copolymer, with particular preference an anhydride-grafted, in particular maleic-anhydride-grafted, ethylene/α-olefin copolymer, in particular ethylene/butylene, ethylene/propylene, or ethylene-propylene/ethylene-butylene copolymer thus modified/grafted.

The plasticizer is preferably selected as hydroxybenzoic-ester-based and/or sulfonamide-based plasticizer, preferably from the class of the N-substituted sulfonamide plasticizers, with particular preference in the form of BBSA.

The proportion of the component (C) in the material of the external layer is preferably in the range of 0.1-3 percent by weight, preferably in the range of 0.5-1 percent by weight, based on the entire composition of the external layer, wherein these values preferably apply to all additives differing from conductivity additives. If the component. (C) comprises a conductivity additive, preferably carbon black, the proportion thereof is then preferably in a range of 0.1-28 percent by weight, preferably 10-27 percent by weight, based on the entire composition of the external layer. If the additives comprise conductivity additives, the proportion of the component (C) is therefore then preferably in the range of 10-28 percent by weight, very preferably in the range of 12-27 percent by weight, based on the entire composition of the external layer.

The component (C) can be selected from at least one added substance from the following group: antioxidants, processing aids, UV stabilizers, heat stabilizers, pigments, dyes, masterbatch carriers, conductivity additives, lubricants and mixtures thereof.

It is particularly preferable that the component (C) comprises a heat stabilizer in the form of an organic heat stabilizer, in particular based on a phenol, on a phosphonite or on a HALS stabilizer.

The at least one impact modifier is preferably selected as an acid-modified ethylene-α-olefin copolymer, with particular preference as an anhydride-grafted, in particular maleic-anhydride-grafted, ethylene/α-olefin copolymer, in particular ethylene/butylene, ethylene/propylene, or ethylene-propylene/ethylene-butylene copolymer thus modified/grafted.

The additives of the component (C) can additionally or alternatively comprise at least one heat stabilizer selected from compounds of mono- or divalent copper, stabilizers based on secondary aromatic amines, stabilizers based on sterically hindered phenols, phosphites/phosphonites, and mixtures thereof.

The thermoplastic molding compositions of the invention moreover preferably comprise, as component (C), 0 to 3% by weight, preferably 0.02 to 2.0% by weight, particularly preferably 0.1 to 1.5 s by weight, of at least one heat stabilizer (again based in each case on the entire composition, i.e. on the entirety of (A)-(C)).

In a preferred embodiment, the heat stabilizers are selected from the group consisting of
compounds of mono- or divalent copper, e.g. salts of mono- or divalent copper with inorganic or organic acids or mono- or dihydric phenols, the oxides of mono- or divalent copper, or the complexes of copper salts with ammonia, amines, amides, lactams, cyanides or phosphines, preferably Cu(I) or Cu(II) salts of the hydrohalic acids or of the hydrocyanic acids, or the copper salts of the aliphatic carboxylic acids. Particular preference is given to the monovalent copper compounds CuCl, CuBr, CuI, CuCN and $Cu_2O$, and also the divalent copper compounds $CuCl_2$, $CuSO_4$, CuO, copper (II) acetate or copper (II) stearate. If a copper compound is used, the quantity of copper is preferably 0.005 to 0.5% by weight, in particular 0.006 to 0.3% by weight and particularly preferably 0.01 to 0.25% by weight, based on the entirety of the components (A) to (C).

The copper compounds are available commercially, or production thereof is known to the person skilled in the art. The copper compound can be used per se or in the form of concentrates (masterbatch). The term concentrate here means a polymer, preferably of the same chemical type as component (A), which comprises a high concentration of the copper salt. The use of concentrates is a customary procedure, and occurs particularly frequently when the intention is to meter very small quantities of a starting material. The copper compounds are advantageously used in combination with further metal halides, in particular alkali metal halides, for example NaI, KI, NaBr, KBr, wherein the molar ratio of metal halide to copper halide is 0.5 to 20, preferably 1 to 10 and particularly preferably 3 to 7.

Stabilizers based on secondary aromatic amines, wherein the quantity present of these stabilizers is preferably 0.2 to 2% by weight, preferably 0.2 to 1.5% by weight, Stabilizers based on sterically hindered phenols, wherein the quantity present of these stabilizers is preferably 0.1 to 1.5% by weight, preferably 0.2 to 1.0% by weight, and Phosphites and phosphonites, and also Mixtures of the abovementioned stabilizers.

Particularly preferred examples of stabilizers which can be used in the invention and are based on secondary aromatic amines are adducts of phenylenediamine with acetone (Naugard A), adducts of phenylenediamine with linolene, Naugard 445, N,N'-dinaphthyl-p-phenylenediamine, N-phenyl-N'-cyclohexyl-p-phenylenediamine and mixtures of two or more thereof.

Compounds suitable as sterically hindered phenols are in principle all of those having phenolic structure which have at least one bulky group on the phenolic ring. Preferred examples of stabilizers which can be used in the invention and are based on sterically hindered phenols are N,N'-hexamethylenebis-3-(3,5-di-tert-butyl-4-hydroxyphenyl) propionamide, bis(3,3-bis(4'-hydroxy-3'-tert-butylphenyl) butanoic acid) glycol ester, 2,1'-thioethyl bis(3-(3,5-di-tert-butyl-4-hydroxyphenyl)propionate), 4,4'-butylidenebis(3-methyl-6-tert-butylphenol), triethylene glycol 3-(3-tert-butyl-4-hydroxy-5-methylphenyl)propionate and mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythritol disphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl) 4,4'-biphenylene diphosphonite, 6-isooctyloxy-2-4,8,10-tetra-tert-butyl-12H-dibenz[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl) methyl phosphite and bis(2,4-di-tert-butyl-6-methylphenyl) ethyl phosphite. Preference is in particular given to tris(2-tert-butyl-4-thio(2'-methyl-4'-hydroxy-5'-tert-butyl) phenyl-5-methyl phenyl phosphite and tris(2,4-di-tert-butylphenyl) phosphite (Hostanox® PAR24: product commercially available from Clariant, Basel). A preferred embodiment of the heat stabilizer consists in the combination of organic heat stabilizers, in particular in the combination of organic stabilizers based on a phenol, a phosphonite and a HALS stabilizer, e.g. Hostanox O 3P, Sandostab P-EPQ and Hostavin N 30 P, or in the combination of organic heat stabilizers (in particular Hostanox PAR 24 and Irganox 1010), a bisphenol-A-based epoxide (in particular Epikote 1001) and a copper stabilizer system based on CuI and KI. An example of a commercially available stabilizer mixture consisting of organic stabilizers and epoxides is Irgatec NC66 from BASF.

In particular, preference is given to a heat stabilizer system exclusively based on CuI and KI, and the molding compositions are preferably free from nigrosine.

In other words, the additives of the component (C) preferably comprise at least one stabilizer in the form of a copper halide or a mixture of a copper halide with a potassium halide, preferably a mixture of CuI and KI, wherein the latter is preferably present in a molar excess of 4-20 in the mixture, and wherein the proportion of the stabilizer based on the copper halide, optionally together with a potassium halide, is preferably in the range of 0.01-0.10 percent by weight, preferably in the range of 0.03-0.07 percent by weight, based in each case on 100 percent by weight of the entire polyamide molding composition (A)-(C). The thermoplastic molding compositions of the invention can comprise, as further components (C), customary processing aids such as stabilizers, oxidation retarders, further agents to inhibit thermal decomposition and decomposition by ultraviolet light, lubricants and mold-release agents, colorants such as dyes and pigments, nucleating agents, plasticizers, flame retardants, etc.

Examples that may be mentioned for oxidation retarders and heat stabilizers are phosphites and further amines (e.g. TAD), hydroquinones, various substituted representatives of these groups and mixtures thereof in concentrations up to 1% by weight, based on the weight of the thermoplastic molding compositions.

The following may be mentioned as UV stabilizers, which are generally used in quantities up to 2% by weight, based on the molding composition: various substituted resorcinols, salicylates, benzotriazoles, triazines, hindered amine light stabilizers (HALS) and benzophenones.

It is moreover possible to add inorganic pigments as component (C), for example titanium dioxide, ultramarine blue, iron oxide and carbon black and/or graphite, and moreover organic pigments, for example phthalocyanines, quinacridones, perylenes, and also dyes, for example anthraquinones, as colorants.

The component (C) can also comprise at least one conductivity additive. The conductivity additive is preferably carbon black. However, it is also possible to use single-walled, double-walled or multiple-walled carbon nanotubes, graphene or graphene derivatives, or to use a combination of carbon black, carbon nanotubes and/or graphene and/or graphene derivatives. The proportion of conductivity additive as part of the component (C) is preferably in the range 1-27% by weight, particularly preferably in the range of 5-25; by weight, based in each case on the entire composition, e.g. on the entirety of (A)-(C).

Another preferred embodiment of the plastics line proposed here is characterized in that the structure of the internal layer is based on fluoropolymer based at least on ethylene and tetrafluoroethylene. The fluoropolymer can additionally comprise further propylene blocks and/or hexene blocks, preferably hexafluoropropylene blocks and/or perfluorohexene blocks. These blocks are generally present in subordinate quantity, typically in the range of in each case 0.01-1 mol % or 0.01-0.3 mol %, based on the total molar quantity of the starting monomers.

The fluoropolymer is preferably configured as fluorine-containing ethylenic polymer which has a carbonyl group and which with particular preference comprises no amide group, imide group, urethane group or urea group.

It is further preferable that the internal layer consists of the following constituents:
(a) 75-100 percent by weight, preferably 85-98 percent by weight, of fluoropolymer based at least on ethylene and tetrafluoroethylene, with or without hexafluoropropylene blocks and/or perfluorohexene blocks, preferably having carbonyl groups;
(b) 0-25 percent by weight of additives;
wherein the components (a) and (b) give a total of 100 percent by weight of the material of the internal layer.

The carbonyl group content of the fluorine-containing ethylenic polymer having the carbonyl group is preferably 3 to 1000 groups in total per $1\times10^6$ main-chain carbon atoms. The carbonyl group of the fluorine-containing ethylenic polymer having the carbonyl group can derive from a peroxide. The fluorine-containing ethylenic polymer can be a polymer having at least one type of carbonyl group selected from the group consisting of carbonate group, carbonyl halide group and carboxy group in a total quantity of 3 to 1000 groups per $1\times10^6$ main-chain carbon atoms. Possible examples are fluorine-containing ethylenic polymers which have a carbonyl group and which are of the type described in EP-A-1 270 209.

The component (b) of the internal layer can be selected from at least one added substance from the following group: antioxidants, processing aids, UV stabilizers, heat stabilizers, pigments, masterbatch carriers, conductivity additives, lubricants and mixtures thereof. The component (b) of the internal layer can in particular comprise a heat stabilizer in the form of an organic heat stabilizer, in particular based on a phenol, on a phosphonite or on a HALS stabilizer.

It is particularly preferable that the internal layer is equally equipped with a conductivity additive or takes the form of conductive polymer, Another preferred embodiment is characterized in that the component (b) comprises at least one conductivity additive, preferably in a proportion in the range of 0.1-20 percent by weight, based on the entire composition of the internal layer. As electrically conductive material for the purposes of the conductivity additive, the following can be mixed as component (b) into the internal layer: particles made of metal fibers, of metal powder, of metal oxide powder, of conductive carbon black, of conductive carbon fiber, of conductive carbon nanotubes, of conductive graphite powder, of conductive graphite fiber, graphene, bronze powder, bronze fiber, steel powder, steel fiber, iron powder, iron fiber, copper powder, copper fiber, silver powder, silver fiber, aluminum powder, aluminum fiber, nickel powder, nickel fiber, tungsten powder, tungsten fiber, gold powder, gold fiber, copper-manganese-alloy powder, copper-manganese fiber and combinations thereof and mixtures thereof. If electrical conductivity is thus provided to the internal layer, the electrical surface resistance of the internal layer is preferably not more than $10^3\Omega$ or not more than $10^6\Omega$, preferably not more than $10\Omega$. The proportion of the electrically conductive material is preferably set in a manner such that the electrical surface resistance of the internal layer is within the range mentioned. The average cross-sectional diameter of the conductive particles of the conductivity additive is preferably about 0.1 micron to about 100 microns. A coating may have been applied to the conductive particles, in order to provide coated conductive particles as the conductive particles.

It is generally preferable that the structure comprises an innermost layer made of fluoropolymer and an external layer made of polyamide. Further layers can then be present externally, i.e. the external layer made of polyamide is present as outermost layer, or alongside the external layer there are one or two further layers, preferably made of polyamide.

The invention provides further embodiments, for example a three-layer structure in which the innermost fluoropolymer layer and the directly adjoining polyamide layer are arranged as in claim 1, and these layers are further enclosed by a further polyamide layer. A four-, five- or six-layer structure is likewise in accordance with the claims, wherein the internal layer and the directly adjoining external layer are arranged as in claim 1.

The structure particularly preferably consists of an innermost layer made of fluoropolymer and an external layer made of polyamide as set out above.

The present invention further provides a plastics line which is characterized in that the thickness of the internal layer is in the range of 0.08-1 mm, preferably in the range of 0.1-0.9 mm, and/or the thickness of the external layer is in the range of 0.5-2 mm, preferably in the range of 0.6-1.75 mm, wherein the total wall thickness of the line is preferably in the range of 0.9-3 mm, with particular preference in the range of 1.0-2.0 mm.

The proposed plastics line is typically produced in a coextrusion process.

The proposed plastics line is configured as a line which can be configured at least sectionally as corrugated pipe, preferably as line for internal combustion engines, in particular in the automobile sector, in particular for fuel, with particular preference gasoline, urea or coolant.

The present invention further provides a process for the production of a plastics line as described above and which is characterized in that the two layers, i.e. internal layer and external layer, are molded in a continuous and/or batch process, preferably in an extrusion blow molding process, a tandem extrusion process, a sheathing process, an injection-molding process, in particular an internal-(gas)-pressure injection-molding process, or a (co)extrusion process, to give a hollow body, with particular preference to give a line.

The dependent claims provide further embodiments.

BRIEF DESCRIPTION OF THE DRAWINGS

Preferred embodiments of the invention are described below with reference to the drawings, which serve merely for illustration and are to be understood as non-restrictive. In the drawing.

DESCRIPTION OF PREFERRED EMBODIMENTS

Figure 1:
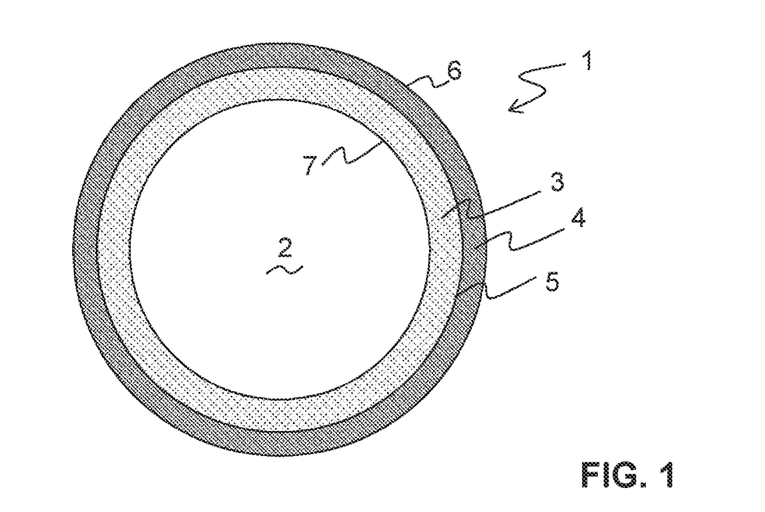
FIG. 1 shows a fuel line in a sectional view perpendicular to the running direction.
Figure 2:
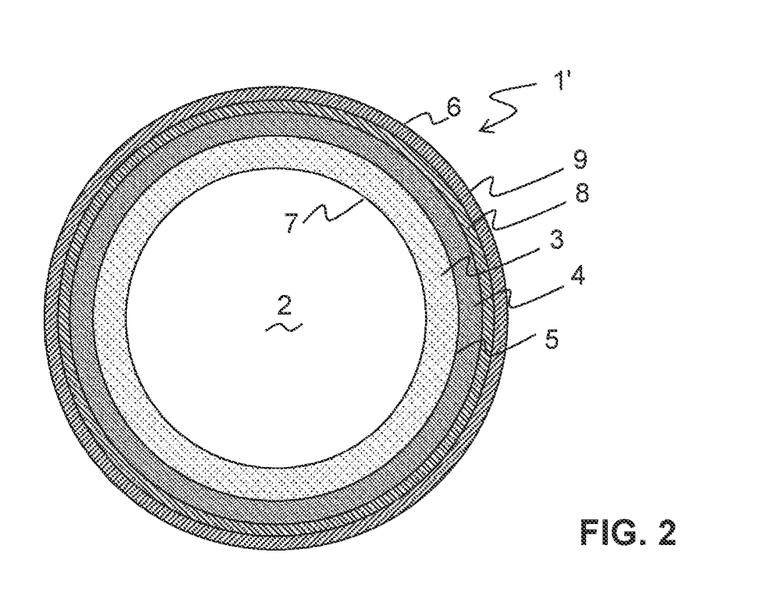
FIG. 2 shows another example of a fuel line 1' of the invention in a section perpendicular to the main running direction; this fuel line has five layers: outside of the external layer 4 there is a further external layer 8 and an outermost layer 9, wherein the structure of the innermost fluoropolymer layer (3) and of the directly adjoining polyamide layer (4) is as described above; most importantly, the structure has the particular adhesion between the layers 3 and 4.

FIG. 1 shows an example of a fuel line 1 of the invention in a section perpendicular to the main running direction. The line is in particular intended for fuels for vehicles, specifically gasoline or diesel. The line is preferably for gasoline, i.e. a hydrocarbon mixture. Main constituents of the gasoline are primarily alkanes, alkenes, cycloalkanes and aromatic hydrocarbons having 5 to 11 carbon atoms per molecule and a boiling range between 25° C. and about 210° C. Alongside these, various ethers (such as MTBE, ETBE) and alcohols (ethanol and optionally methanol) can be admixed with the unmodified gasoline. The ethers and/or the ethanol increase the knocking resistance of the gasoline. The cross-sectional area here can be constant along the main running direction, i.e. the shape of the pipe can in essence be hollow-cylindrical.

However, the cross-sectional area can also vary along the main running direction, for example in the form of a corrugated pipe.

The pipe wall encloses an internal space 2. The internal space 2 is followed radially outward firstly by an internal layer 3, the internal surface 7 of which adjoins the internal space 2 and delimits same. The configuration of this internal layer is based on a fluoropolymer.

Directly adjoining the internal layer 3, with no adhesion-promoter layer therebetween in the contact region 5, there follows an external layer 4, the configuration of which is based on polyamide 616, preferably without further constituents consisting of other polyamides. The external surface 6 of the external layer 4 delimits the line externally.

Starting Materials Used:
External Layer:

PA 12: polyamide 12: $\eta_{rel}$=2.2 (m-cresol); $T_m$ measured by DSC in accordance with ISO 11357 (2011)=173° C., obtainable with trademark Grilamid L 25 W 40 X, EMS-CHEMIE AG, Switzerland.

PA 612: polyamide 612: $\eta_{rel}$=2.3 (m-cresol); $T_m$ measured by DSC in accordance with ISO 11357 (2011)=218° C., plasticized and impact modified, obtainable with trademark Grilamid 21) 25 W 20 X, EMS-CHEMIE AG, Switzerland.

PA 616: polyamide 616: $\eta_{rel}$=2.2 (m-cresol); $T_m$ measured by DSC in accordance with ISO 11357 (2011)=197° C., plasticized and impact modified.

TABLE 1

Composition of PA 616

| | | |
|---|---|---|
| Polyamide 616 ($\eta_{rel}$ = 2.2) | % by weight | 85.7 |
| Plasticizer | % by weight | 8.0 |
| Impact modifier | % by weight | 5.0 |
| Hostanox O 3 P | % by weight | 0.5 |
| Sandosab P-EPQ | % by weight | 0.2 |
| Hostavin N 30 P | % by weight | 0.3 |
| Tinuvin 234 | % by weight | 0.2 |
| Magnesium stearate | % by weight | 0.1 |
| Polyamide 616 ($\eta_{rel}$ = 2.1) | % by weight | 62.7 |
| Impact modifier | % by weight | 10.0 |
| Hostanox O 3 P | % by weight | 0.3 |
| Carbon black | % by weight | 27.0 |

PA 616-ESD: polyamide 616: $\eta_{rel}$ = 2.1 (m-cresol); $T_m$ measured by DSC in accordance with ISO 11357 (2011) = 197° C., impact-modified and comprising carbon black.
PA 12-HV: adhesion (elastomer)- and impact-modified polyamide 12: obtainable as Grilamid XE 4076 from EMS-CHEMIE AG, Switzerland.
PA 6: heat-stabilized, impact-modified and plasticized polyamide 6, obtainable as Grilon BRZ 347 W from EMS-CHEMIE AG, Switzerland.
BBSA (N-butylbenzenesulfonamide) was used as plasticizer (P). This is obtainable with trademark Uniplex 214 from Lanxess.

Impact modifier: acid-modified ethylene/α-olefin copolymers were used as impact modifier (IM), specifically maleic-anhydride-grafted ethylene-butylene copolymers and maleic-anhydride-grafted ethylene-propylene copolymers, and also mixtures of these.

IM system used: MVR value (measured at 230° C. with 2.16 kg) of 1.3 g/10 min (ASTM D1238), DSC glass transition temperature in accordance with ISO standard 11357-2 (2013) of −60° C., obtainable as Tafmer MC201 from Mitsui Chemicals.

Stabilizers: Hostanox O 3P is a stabilizer based on a hindered phenol with CAS No. 32509-66-3, Sandosab P-EPQ is a diphosphonite stabilizer (CAS: 119345-01-6), and Hostavin N 30 P is a stabilizer based on a hindered amine (HALS) with CAS No. 202483-55-4, all obtainable from Clariant.

Tinuvin 234 is a UV stabilizer based on benzotriazole with CAS No. 70321-86-7, obtainable from BASF SE. Magnesium stearate, purchased from Bärlocher GmbH, Munich, was used as lubricant.

Carbon black: carbon black with trademark ENSACO 250 Granules from Imerys was used as conductivity additive.

Internal Layer:
Fluoropolymer: material used for the internal layer was either a fluoropolymer based on ethylene and tetrafluoroethylene units (GTFE) or a fluoropolymer based on ethylene, hexafluoropropene and tetrafluoroethylene units (EFEP).

ETFE in the working examples was a product from AGC Chemicals Europe, Ltd., obtainable with trademark FLUON® ETFE. ETFE-ESD in the working examples was a product ETFE AH 600-C, likewise from AGC Chemicals Europe, Ltd.

EFEP used was the commercially available product Neoflon EFEP RP-5000 from Daikin Industries, Ltd., Japan.

Production of the Test Specimens:
Pipes were coextruded in a Nokia Maillefer COEX5 pipe extruder at melt temperatures of 275-285° C. (fluoropolymer) and 240-255° C. (polyamide) at reduced pressure of 27 to 95 mbar and an extrusion speed of 12.9 m/min. Pipes with an external diameter of 8 mm and wall thickness of 1 mm were used as test specimens. The length of the pipe was adjusted as required by the tests. The thickness of the internal layer was 0.1 or 0.2 mm, and that of the external layer and, respectively, the further external layers was 0.9 and, respectively, 0.8 mm.

Tests Carried Out on the Pipe Structures:
Leaching: Test in accordance with SAE J2260 with test fuel FAM-B (in accordance with SAE J1681 (2000))=96-hour test, closed 200 cm pipe at 60° C.; maximal extract on the basis of VW TL 52712-C 6 g/m² (this standard determines ETFE-PA 12 requirements for 0.2 mm ETFE/0.8 mm PA 12).

Low-temperature performance: is tested on the basis of TL 52712-C in accordance with VW standard PV 3905. The drop height of the sphere is 65 cm. At least 10 test samples are tested and the number of fractures is stated in percent.

Pipe tensile test: Pipe tensile tests were carried out in accordance with ISO 527-2 (2012). Tests used test specimens of length 150 mm (tensile tests in extrusion direction) or 10 mm (in the case of tensile tests perpendicular to the extrusion direction). The test temperature was 23° C. and the test velocity was 100 mm/min (for tests in extrusion direction) or 25 mm/min if tests were carried out perpendicular to the extrusion direction.

Tests carried out in accordance with ISO 527 were specifically the following: tensile strain at break in extrusion direction, tensile strain at break perpendicular to the extrusion direction, yield stress in extrusion direction and yield stress perpendicular to the extrusion direction.

Bursting pressure/Comparative stress: in accordance with DIN 73378 at 23° C.

Layer adhesion: was tested in accordance with VW TL 52712 paragraph 6.8 and in accordance with SAE 72260.

Relative viscosity: DIN EN ISO 307 (2007), in 0.5% by weight m-cresol solution or 1% by weight sulfuric acid solution at a temperature of 20° C.

Zinc chloride resistance: test specimens were subjected to a period of immersion in accordance with SAE J2260, section 7.12.2, and then visually assessed for cracks. Test samples that were still intact were then subjected to the pendulum impact test and bursting pressure test in accordance with DIN 73378. Pendulum impact values, reported as percentages, relate to the proportion of tests not passed.

TABLE 2

Compositions and structure

| Structure/Description | | IE1 | IE2 | IE3 | CE1 | CE2 | CE3 |
|---|---|---|---|---|---|---|---|
| Interior layer | | EFEP | EFEP | ETFE | EFEP | EFEP | EFEP |
| Layer thickness | mm | 0.2 | 0.1 | 0.1 | 0.1 | 0.1 | 0.1 |
| Exterior layer | | PA 616 | PA 616 | PA 616 | PA 12 | PA 612 | PA 12-HV |
| Layer thickness | mm | 0.8 | 0.9 | 0.9 | 0.9 | 0.9 | 0.9 |
| Properties | | | | | | | |
| Tensile strain at break in extrusion direction | % | 358 | 351 | 361 | 358 | 364 | 320 |
| Tensile strain at break perpendicular to extrusion direction | % | 385 | 256 | 251 | 221 | 232 | 210 |
| Low-temperature impact resistance (−40° C., 880 g) | | 0 | 0 | 0 | 0 | 0 | 0 |
| Leaching resistance (soluble constituents) | g/mm$^2$ | 1.85 | 3.6 | 1.22 | 5.4 | 5.3 | 5.7 |
| Leaching resistance (insoluble constituents) | g/mm$^2$ | 0.1 | 0.1 | 0.1 | 0.1 | 0.1 | 0.1 |
| Comparative stress in new condition at 23° C. | N/mm$^2$ | 27 | 28 | 29 | 23 | 25 | 23 |
| Comparative stress in new condition at 115° C. | N/mm$^2$ | 10 | 10 | 11 | 6 | 6 | 6 |
| Comparative stress after immersion in FAM-B for 500 h at 23° C. | N/mm$^2$ | 26.6 | 27 | 29.7 | 18 | 19 | 18 |
| Comparative stress after immersion in FAM-B for 500 h at 115° C. | N/mm$^2$ | 10 | 10.5 | 11.2 | 4.7 | 5.1 | 4.8 |
| Change of comparative stress after immersion in FAM-B for 500 h at 23° C. | % | −1.5 | −2.1 | 2.4 | −22 | −24 | −22 |
| Change of comparative stress after immersion in FAM-B for 500 h at 115° C. | % | 0 | −4.5 | 1.8 | −22 | −24 | −22 |
| Adhesion | | not separable | not separable | not separable | separable | separable | separable |
| Zinc chloride resistance | | | | | | | |
| Cracks | | none | none | none | none | cracks | cracks |
| Pendulum impact | % | 0 | 0 | 0 | 20 | n.d. | n.d. |
| Bursting pressure | bar | 77 | 79 | 81 | 66 | n.d. | n.d. | n.d.: not determined because of visual assessment

TABLE 3

Compositions of three-, four- and five-layer structures

| Structure/Description | IE4 | IE5 | IE6 | CE4 | CE5 |
|---|---|---|---|---|---|
| Number of layers | 3 | 3 | 5 | 4 | 4 |
| Layer 1 from inside to outside | ETFE-ESD | ETFE | ETFE | ETFE | ETFE |
| Layer thickness (mm) | 0.1 | 0.1 | 0.1 | 0.1 | 0.1 |
| Layer 2 from inside to outside | PA 616-ESD | PA 616 | PA 616 | PA 612 | PA 612 |

TABLE 3-continued

Compositions of three-, four- and five-layer structures

| Structure/Description | | IE4 | IE5 | IE6 | CE4 | CE5 |
|---|---|---|---|---|---|---|
| Layer thickness (mm) | | 0.1 | 0.1 | 0.1 | 0.1 | 0.1 |
| Layer 3 from inside to outside | | PA 616 | PA 612 | PA 612 | PA 6 | PA 6 |
| Layer thickness (mm) | | 0.8 | 0.8 | 0.1 | 0.4 | 0.4 |
| Layer 4 from inside to outside | | — | — | PA 6 | PA 616 | PA 612 |
| Layer thickness (mm) | | — | — | 0.4 | 0.4 | 0.4 |
| Layer 5 from inside to outside | | — | — | PA 612 | — | — |
| Layer thickness (mm) | | — | — | 0.3 | — | — |
| Properties | | | | | | |
| Tensile strain at break in extrusion direction | % | 340 | 300 | 250 | 200 | 200 |
| Tensile strain at break perpendicular to extrusion direction | % | 250 | 200 | 180 | 130 | 130 |
| Low-temperature impact resistance (−40° C., 880 g) | | 0% | 0% | 0% | 20% | 20% |
| Leaching resistance (soluble constituents) | g/mm$^2$ | 1.2 | 1.2 | 1.5 | 3 | 3 |
| Leaching resistance (insoluble constituents) | g/mm$^2$ | 0 | 0 | 0 | 0 | 0 |
| Comparative stress in new condition at 23° C. | N/mm$^2$ | 27 | 27 | 27 | 27 | 27 |
| Comparative stress in new condition at 115° C. | N/mm$^2$ | 10 | 10 | 10 | 10 | 10 |
| Comparative stress after immersion in FAM-B for 500 h at 23° C. | N/mm$^2$ | 28 | 28 | 28 | 19 | 19 |
| Comparative stress after immersion in FAM-B for 500 h at 115° C. | N/mm$^2$ | 10.5 | 10.5 | 10.5 | 7 | 7 |
| Change of comparative stress after immersion in FAM-B for 500 h at 23° C. | % | 3.7 | 3.7 | 3.7 | −30 | −30 |
| Change of comparative stress after immersion in FAM-B for 500 h at 115° C. | % | 5 | 5 | 5 | −30 | −30 |
| Adhesion | | not separable | not separable | not separable | separable | separable |
| Zinc chloride resistance | | | | | | |
| Cracks | | none | none | none | cracks | cracks |
| Pendulum impact | % | 0 | 0 | 0 | n.d. | n.d. |
| Bursting pressure | bar | 80 | 80 | 80 | n.d. | n.d. |

Discussion of Results

The inventive examples are particularly characterized by their excellent layer adhesion. Analogous aliphatic AABB polymers, i.e. polyamides, consisting of a diamine and of a diacid, surprisingly exhibit different adhesion to the fluoropolymer layer. Polyamide 616, with an average number of 11 carbon atoms (11C) has significantly better adhesion to the fluoropolymer than the long-chain systems such as PA 12 (12C) or PA 612 (9C), which the person skilled in the art knows to be analogous.

Surprisingly, the inventive examples exhibit excellent pressure properties after a period of immersion in a fuel. The comparative stress of the structures according to the claims undergoes only slight decrease after an immersion time of 500 hours in FAM-B. The high zinc-chloride resistance permits problem-free use of the inventive lines in the automobile sector. Such lines exhibit no cracks after a period of immersion in a ZnCl$_2$ solution, and moreover have mechanical properties that are more advantageous than those of known structures based on PA 12 or PA 612.

LIST OF REFERENCE SIGNS

1 Fuel line
2 Internal space
3 Internal layer
4 External layer
5 Contact region between 3 and 4
6 External surface
7 Internal surface
8 Further external layer
9 Outermost layer

The invention claimed is:

1. A plastics line comprising at least two layers, an internal layer which directly or indirectly encloses an internal space of the line, and an external layer which directly adjoins the internal layer,
wherein the structure of the internal layer is based on fluoropolymer,
and
wherein the external layer consists of the following constituents:
(A) 84-88 percent by weight of PA 616, copolymers comprising at least 50 percent by weight of this polyamide, or mixtures of PA 616 with a further thermoplastic (A2) differing therefrom, wherein the proportion of PA 616 in such mixtures is at least 50 percent by weight;
(B) 2-15 percent by weight of at least one selected from the group consisting of impact modifier and plasticizer; and
(C) 0-3 percent by weight of additives differing from (A) and (B), wherein the proportions by weight of the components (A)-(C) give a total of 100 percent by weight of the material of the external layer.

2. The plastics line as claimed in claim 1,
wherein the component (A) consists exclusively of PA 616, or of a copolymer with a proportion of PA 616 of at least 80 percent by weight, or of a mixture of PA 616 with another polyamide, and
wherein the proportion of PA 616 is at least 80 percent by weight, based on the mixture of PA 616 with the other polyamide.

3. The plastics line as claimed in claim 1,
wherein the external layer delimits the line externally, or
herein outside of the external layer there are one or two further external layers, and the outermost thereof delimits the line externally.

4. The plastics line as claimed in claim 1, wherein a conductivity additive is used as the component (C), and the proportion of the component (A) in the material of the external layer is in the range of 84-85 percent by weight.

5. The plastics line as claimed in claim 1, wherein the proportion of the component (B) in the material of the external layer is in the range of 5-15 percent by weight.

6. The plastics line as claimed in claim 1, wherein the material of the external layer comprises at least one impact modifier and at least one plasticizer.

7. The plastics line as claimed in claim 1,
wherein the proportion of the component (C) in the material of the external layer is in the range of 0.1-3 percent by weight; or
wherein component (C) is selected from at least one added substance from the following group: antioxidants, processing aids, UV stabilizers, heat stabilizers, pigments, masterbatch carriers, conductivity additives, lubricants or mixtures thereof.

8. The plastics line as claimed in claim 1,
wherein the structure of the internal layer is based on fluoropolymer based at least on ethylene and tetrafluoroethylene, with or without further blocks selected from the group of: propylene blocks, hexene blocks, or
wherein the internal layer consists of the following constituents:
(a) 75-100 percent by weight of fluoropolymer based at least on ethylene and tetrafluoroethylene, with or without at least one of hexafluoropropylene blocks and perfluorohexene blocks; and
(b) 0-25 percent by weight of additives;
wherein the components (a) and (b) give a total of 100 percent by weight of the material of the internal layer.

9. The plastics line as claimed in claim 1,
wherein the structure of the internal layer is based on fluoropolymer based at least on ethylene and tetrafluoroethylene, with or without further blocks selected from the group of: propylene blocks, hexene blocks, or
wherein the internal layer consists of the following constituents:
(a) 85-98 percent by weight of fluoropolymer based at least on ethylene and tetrafluoroethylene, with or without at least one of hexafluoropropylene blocks and perfluorohexene blocks; and
(b) 2-15 percent by weight of additives;
wherein the components (a) and (b) give a total of 100 percent by weight of the material of the internal layer.

10. The plastics line as claimed in claim 8, wherein component (b) comprises at least one conductivity additive.

11. The plastics line as claimed in claim 1,
wherein the thickness of the internal layer is in the range of 0.08-1 mm, or the thickness of the external layer is in the range of 0.5-2 mm, or
wherein the total wall thickness of the line is in the range of 0.9-3.0 mm.

12. The plastics line as claimed in claim 1, wherein the plastics line consists exclusively of the internal layer and the external layer.

13. The plastics line as claimed in claim 1, wherein the plastics line has been produced in a coextrusion process.

14. The plastics line as claimed in claim 1, in the form of a line which can be configured at least sectionally as corrugated pipe.

15. The plastics line as claimed in claim 1, wherein outside of the external layer there are one or two further external layers, and the outermost thereof delimits the line externally, and the configuration of the further external layer(s) is based on PA 612, PA 6, PA 616, or on a mixture thereof.

16. The plastics line as claimed in claim 1, wherein the further thermoplastic (A2) of the component (A) is a polyamide differing from PA 616, in the form of an aliphatic or semiaromatic polyamide selected from the group consisting of PA 6, PA 612, PA 10T/6T, PA 1212, PA 66, PA 11, PA106, PA1012, PA 10T/612, PA 10T/610, and PA9T.

17. The plastics line as claimed in claim 1, wherein the component (A) is free from PA 12, or free from polyamide elastomers, or free not only from PA 12 but also from polyamide elastomers.

18. The plastics line as claimed in claim 1, wherein a conductivity additive comprising carbon black is used as the component (C).

19. The plastics line as claimed in claim 1, wherein the proportion of the component (B) in the material of the external layer is in the range of 10-15 percent by weight.

20. The plastics line as claimed in claim 1, wherein the component (B) of the material of the external layer comprises at least one impact modifier and at least one plasticizer, and
wherein the proportion present of the impact modifier is in the range of 2-10 percent by weight, and the proportion present of the plasticizer is in the range of 2-12 percent by weight, based on 100 percent by weight of the material of the external layer.

21. The plastics line as claimed in claim 1, wherein the component (B) of the material of the external layer comprises at least one impact modifier which is an acid-modified ethylene-α-olefin copolymer, or wherein the component (B) of the material of the external layer comprises at least one plasticizer selected from hydroxybenzoic-ester-based and sulfonamide-based plasticizers.

22. The plastics line as claimed in claim 1, wherein the proportion of the component (C) in the material of the external layer is in the range of 0.5-1 percent by weight; or wherein the component (C) comprises a heat stabilizer in the form of an organic heat stabilizer, or wherein the component (C) comprises a conductivity additive including carbon black in a proportion in the range of 0.1-3 percent by weight, based on 100 percent by weight of the material of the external layer.

23. The plastics line as claimed in claim 1, wherein the structure of the internal layer is based on fluoropolymer based at least on ethylene and tetrafluoroethylene, with or without further blocks selected from the group of: hexafluoropropylene blocks, perfluorohexene blocks, or wherein the internal layer consists of the following constituents:

(a) 85-98 percent by weight, of fluoropolymer based at least on ethylene and tetrafluoroethylene, with or without hexafluoropropylene blocks and/or perfluorohexene blocks, having carbonyl groups; and (b) 0-25 percent by weight of additives, wherein the components (a) and (b) give a total of 100 percent by weight of the material of the internal layer.

24. The plastics line as claimed in claim 8, wherein the component (b) comprises at least one additive for increasing electrical conductivity.

25. The plastics line as claimed in claim 8, wherein the component (b) comprises at least one conductivity additive, in a proportion in the range of 0.1-20 percent by weight, based on 100 percent by weight of the material of the internal layer.

26. The plastics line as claimed in claim 1, wherein the thickness of the internal layer is in the range of 0.1-0.9 mm, or wherein the thickness of the external layer is in the range of 0.6-1.75 mm, or wherein the total wall thickness of the line is in the range of 1.0-2.0 mm.

27. The plastics line as claimed in claim 1, in the form of a line which can be configured at least sectionally as corrugated pipe, as line for internal combustion engines.

28. A process for the production of the plastics line as claimed in claim 1, wherein the external layer and the internal layer are molded in a continuous or batch process, to give a hollow body including the line.

29. The process for the production of the plastics line as claimed in claim 28, wherein the external layer and the internal layer are molded in an extrusion blow molding process, a tandem extrusion process, an injection-molding process, an internal-pressure injection-molding process, a sheathing process, or a (co) extrusion process, to give a hollow body including the line.

* * * * *